United States Patent
Ecimovic et al.

(10) Patent No.: US 11,635,998 B2
(45) Date of Patent: Apr. 25, 2023

(54) STANDARD API FOR INTEGRATED DEVELOPMENT ENVIRONMENTS

(71) Applicant: Silicon Laboratories Inc., Austin, TX (US)

(72) Inventors: Timotej Ecimovic, Hull, MA (US); Jing Teng, Somerville, MA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/347,074

(22) Filed: Jun. 14, 2021

(65) Prior Publication Data
US 2022/0398138 A1    Dec. 15, 2022

(51) Int. Cl.
G06F 3/00 (2006.01)
G06F 9/54 (2006.01)

(52) U.S. Cl.
CPC ............. G06F 9/541 (2013.01); G06F 9/542 (2013.01)

(58) Field of Classification Search
CPC ...................................... G06F 9/541
USPC ............................................ 719/328
See application file for complete search history.

(56) References Cited

U.S. PATENT DOCUMENTS

| | | | |
|---|---|---|---|
| 6,714,201 B1* | 3/2004 | Grinstein | G06T 13/20 700/61 |
| 8,312,552 B1* | 11/2012 | Hadden | G06F 21/10 713/176 |
| 2007/0078953 A1* | 4/2007 | Chai | G06F 9/451 709/219 |
| 2007/0162855 A1* | 7/2007 | Hawk | G11B 27/34 715/730 |
| 2008/0034292 A1* | 2/2008 | Brunner | G06T 1/20 715/764 |
| 2008/0104617 A1* | 5/2008 | Apacible | G16H 10/60 719/328 |
| 2014/0047409 A1* | 2/2014 | Yang | G06F 8/20 717/105 |
| 2015/0143459 A1* | 5/2015 | Molnar | H04L 67/02 726/2 |
| 2016/0049094 A1* | 2/2016 | Gupta | G09B 9/00 434/185 |
| 2016/0092502 A1* | 3/2016 | Krishnamurthy | G06F 16/2428 707/691 |

(Continued)

OTHER PUBLICATIONS

Christian Benjamin Ries, Generation of an Integrated Development Environment (IDE) for Berkeley Open Infrastructure for Network Computing (BOINC). (Year: 2011).*

(Continued)

*Primary Examiner* — Lechi Truong
(74) *Attorney, Agent, or Firm* — Nields, Lemack & Frame, LLC

(57) ABSTRACT

A system and method for embedding a tool into an Integrated Development Environment (IDE) is disclosed. The system includes a special application programming interface (API) that is used to embed any tool into any IDE. The API provides a way for the tool to indicate what functions are supported by the tool. These functions may include save, print, edit and others. The API also provides a mechanism for the IDE to communicate to the tool that one of the supported functions is to be executed. Finally, the API provides a mechanism for the tool to report information to the IDE as necessary.

15 Claims, 5 Drawing Sheets

(56) References Cited

U.S. PATENT DOCUMENTS

2020/0058263 A1* 2/2020 McKeever ............. G09G 5/001
2021/0318857 A1* 10/2021 Chitgupakar ........... G06F 9/547

OTHER PUBLICATIONS

Andre Riboira, Integrating Interactive Visualizations of Automatic Debugging Techniques on an Integrated Development . (Year: 2012).*
Xianjun Chen, Restful API Architecture Based on Laravel Framework . (Year: 2016).*

* cited by examiner

```
API={
FEATURELEVEL:1, //SPECIFIES THE FEATURE OR REVISION NUMBER//
DESCRIPTION: "TOOL RENDERER API", //HUMAN READABLE DESCRIPTION FOR THE TOOL API//
NOTIFICATIONS: { //NOTIFICATION OBJECT; A LIST OF NOTIFICATIONS FOLLOWS//
   DIRTYFLAG: { //THIS IS A NOTIFICATION THAT REPORTS THAT A FILE HAS BEEN MODIFIED BUT NOT SAVED
   ARG: 'DIRTYSTATE' //ARGUMENT USED BY DIRTYFLAG NOTIFICATION
   NOTIFICATION2: { //SECOND NOTIFICATION
   ARG: 'NOTIFICATION_VARIABLE',//ARGUMENT THAT ACCOMPANIES THIS NOTIFICATION
},
FUNCTIONS: {//FUNCTION OBJECT, A LIST OF FUNCTIONS FOLLOWS//
   OPEN: { // THIS IS A FUNCTION NAME
   DESCRIPTION:" OPEN FILE..." // HUMAN READABLE DESCRIPTION
   ARG: [ 'FILENAME', IDE_PATH'] //THIS LISTS THE ARGUMENTS ASSOCIATED WITH THE OPEN FUNCTION
   }
   SAVE: { // THIS IS A FUNCTION NAME
   DESCRIPTION: "SAVE FILE..." //HUMAN READABLE DESCRIPTION
   ARG: 'FILENAME' //THIS LISTS THE ARGUMENTS ASSOCIATED WITH THE SAVE FUNCTION
   }
FUNCTION3: { // THIS IS A THIRD FUNCTION NAME
   DESCRIPTION: "THIRD FUNCTION" // HUMAN READABLE DESCRIPTION
   ARG: 'FUNCTION3_VARIABLE', ;//IF PRESENT THIS LISTS THE ARGUMENTS WITH THE THIRD FUNCTION
   }
}
```

FIG. 3

STANDARD API FOR INTEGRATED DEVELOPMENT ENVIRONMENTS

This disclosure describes systems and methods for allowing seamless integration of a tool into an integrated development environment (IDE).

BACKGROUND

Integrated Development Environments (IDE) are utilized to provide the necessary components for software or system development. In certain embodiments, the IDE may include a source code editor, build automation tools and a debugger. The IDE may also include a compiler.

In certain embodiments, the IDE also includes a web-based graphical components, such as a Chromium engine. In some embodiments, another software application, referred to as a tool, may utilize this graphical component and be embedded in the IDE.

However, the interface between the tool and the IDE is not well defined. Therefore, to embed a tool into an IDE, special drivers are written that are specific to this combination of IDE and tool. While this is acceptable if the number of tools and IDEs is very small, it quickly becomes unwieldy, as the number of drivers that must be developed is N*M, where N is the number of IDEs and M is the number of tools.

Therefore, it would be beneficial if there were a system and method that reduced the number of drivers that needed to be developed to embed a tool into an IDE. Furthermore, it would be advantageous if there was a standard interface that could be used to easily embed a tool into an IDE.

SUMMARY

A system and method for embedding a tool into an Integrated Development Environment (IDE) is disclosed. The system includes a special application programming interface (API) that is used to embed any tool into any IDE. The API provides a way for the tool to indicate to the IDE what functions are supported by the tool. These functions may include save, print, edit and others. The API also provides a mechanism for the IDE to communicate to the tool that one of the supported functions is to be executed. Finally, the API provides a mechanism for the tool to report information to the IDE as necessary.

According to one embodiment, an integrated software platform is disclosed. The integrated software platform comprises an Integrated Development Environment (IDE), comprising: IDE specific code; tool interface code; a chromium engine; and an IDE-side Renderer API; and a tool, comprising a tool front end that executes within the chromium engine; and a tool-side Renderer API; wherein the tool-side Renderer API communicates with the IDE-side Renderer API using a standard interface defined by a Renderer_api_info object defined in the tool-side Renderer API. In certain embodiments, the standard interface comprises an execution function and a notification function. In some embodiments, the Renderer_api_info object defines one or more functions, wherein a function is a communication from the IDE to the tool to perform an operation. In certain embodiments, the Renderer_api_info object defines one or more notifications, wherein a notification is a communication from the tool to the IDE to provide status or other information. In certain embodiments, the IDE constructs the execution function, comprising one of the one or more functions defined in the Renderer_api_info object, to cause the tool to perform the operation. In certain embodiments, the tool constructs the notification function, comprising one of the one or more notifications defined in the Renderer_api_info object, to inform the IDE of status or other information. In some embodiments, the notification function is used by the IDE to define the notification mechanism that the tool is to utilize when providing status or other information to the IDE.

According to another embodiment, an integrated development environment (IDE) is disclosed. The IDE comprises IDE specific code; tool interface code; a chromium engine; and an IDE-side Renderer API; wherein a tool executes within the chromium engine; wherein the tool and the IDE communicate using a standard interface defined by a Renderer_api_info object defined in the tool. In some embodiments, the standard interface comprises an execution function and a notification function. In certain embodiments, the IDE constructs the execution function, comprising one of the one or more functions defined in the Renderer_api_info object, to cause the tool to perform the operation. In some embodiments, the notification function is used by the IDE to define the notification mechanism that the tool is to utilize when providing status or other information to the IDE.

According to another embodiment, a method of integrating a tool with an Integrated Development Environment (IDE), wherein the IDE comprises a chromium engine and the tool comprises frontend software that executes within the chromium engine, is disclosed. The method comprises: including an IDE-side Renderer API in the IDE; including a tool-side Renderer API in the tool; and wherein the tool-side Renderer API communicates with the IDE-side Renderer API using a standard interface defined by a Renderer_api_info object defined in the tool-side Renderer API. In certain embodiments, the standard interface comprises an execution function and a notification function. In some embodiments, the Renderer_api_info object defines one or more functions, wherein a function is a communication from the IDE to the tool to perform an operation. In certain embodiments, the Renderer_api_info object defines one or more notifications, wherein a notification is a communication from the tool to the IDE to provide status or other information. In certain embodiments, the IDE constructs the execution function, comprising one of the one or more functions defined in the Renderer_api_info object, to cause the tool to perform the operation. In certain embodiments, the tool constructs the notification function, comprising one of the one or more notifications defined in the Renderer_api_info object, to inform the IDE of status or other information. In some embodiments, the notification function is used by the IDE to define the notification mechanism that the tool is to utilize when providing status or other information to the IDE.

BRIEF DESCRIPTION OF THE DRAWINGS

For a better understanding of the present disclosure, reference is made to the accompanying drawings, in which like elements are referenced with like numerals, and in which:

FIG. 3 shows the renderer_api_info object according to one embodiment;

DETAILED DESCRIPTION

Figure 1:
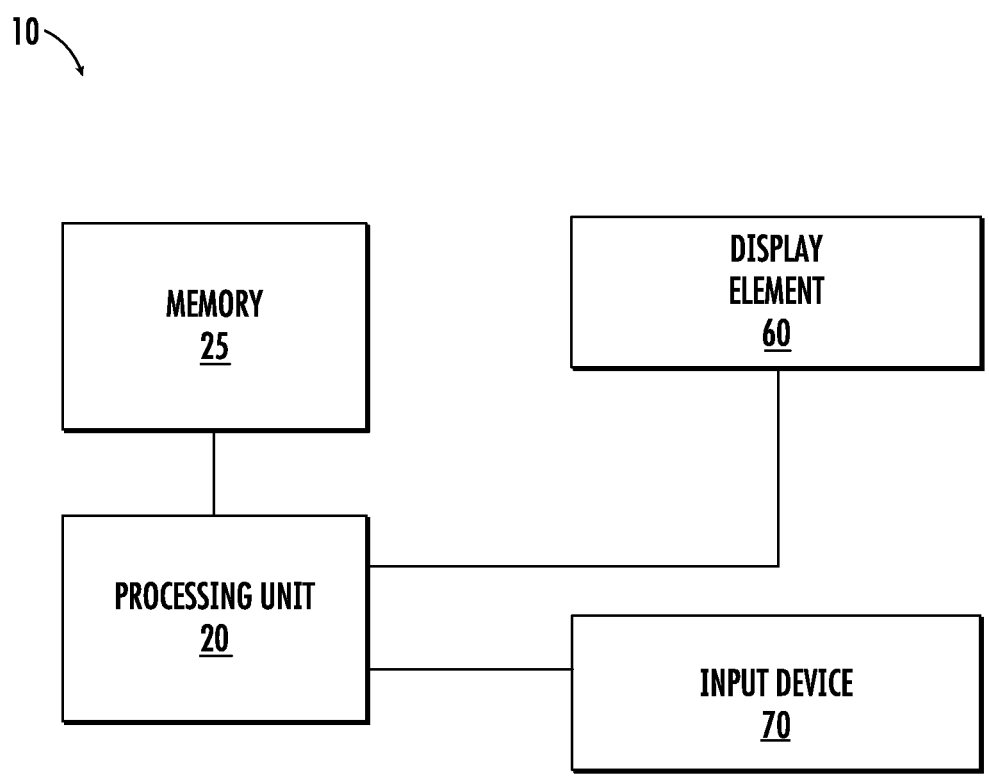
FIG. 1 is a block diagram of a computing system that may be used to execute the IDE.

An integrated development environment is typically executed on a PC, such as a desktop computer, a laptop computer or a similar device. However, an IDE may be executed on any computing device. FIG. 1 shows one such computing device 10.

The computing device 10 has a processing unit 20 and an associated memory device 25. This memory device 25 when executed by the processing unit 20, enable the computing device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. In certain embodiments, the memory device 25 may be packaged with the processing unit 20. The processing unit 20 may be any suitable device, including but not limited to a general purpose processor, an application specific processor, an embedded controller, or a personal computer (PC).

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device. The instructions contained on this second computer readable media may be downloaded onto the memory device 25 to allow execution of the instructions by the computing device 10.

For example, the computing device 10 may also include a user interface that includes a display element 60 and/or an input device 70. In some embodiments, the display element 60 may be an LCD screen. In certain embodiments, the display element 60 is a touch screen so that input may be supplied to the processing unit 20 through the display element 60. In other embodiments, the computing device 10 may also be in communication with a separate input device 70 to allow user entry. The input device may be a pointing device, such as a mouse, a keyboard joystick, or other device. In other words, the display element 60 and the input device 70 are not limited to those enumerated above.

Although not shown, the computing device 10 also has a power supply, which may be a battery or a connection to a permanent power source, such as a wall outlet.

Having described the structure of the computing system, the architecture of the IDE and the tool will be described.

Figure 2:
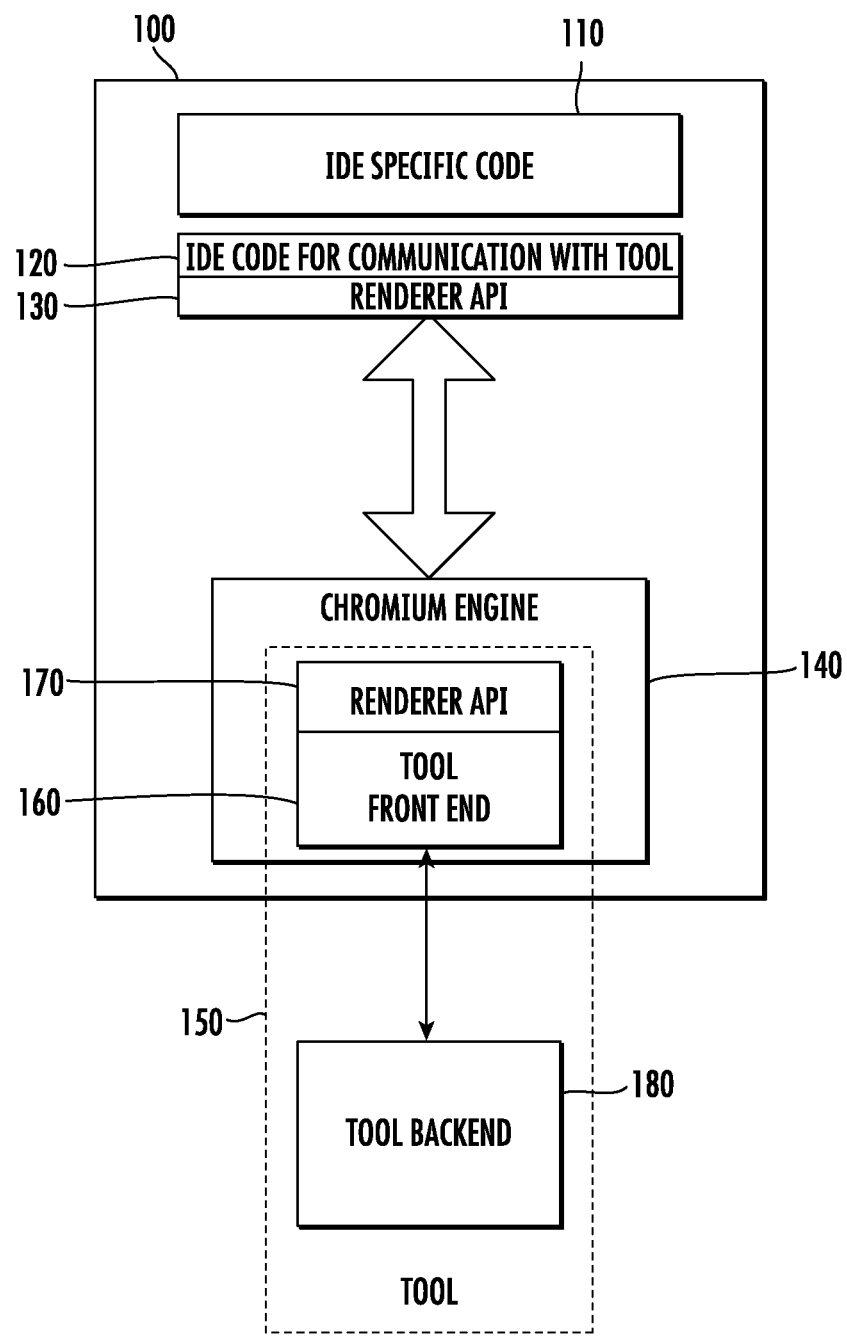
FIG. 2 is a block diagram of the relevant parts of the IDE and the embedded tool.

FIG. 2 shows a representation of the architecture used to embed a tool into an IDE to form an integrated software platform. The IDE 100 is executed on a computing device 10, such as that shown in FIG. 1. The IDE 100 may be a standard integrated development environment, such as Eclipse, Visual Studio Code, emacs, Atom, IntelliJ IDEA and others. Alternatively, the IDE 100 may be proprietary code.

The IDE 100 may be used to develop code in any desired language, such as Python, C++, java, typescript and others. The IDE 100 includes IDE specific code 110, which may be unrelated to the tool 150. The IDE also includes tool interface code 120 designed to communicate with the tool. The special API, which may be referred to as the Renderer API in this disclosure, is disposed within the tool interface code 120. The Renderer API may be divided into two parts, the IDE-side Renderer API 130 and the Tool-side Renderer API 170. A web browser, such as a Chromium Engine 140 may also be disposed within the IDE 100.

The tool 150 may comprise frontend software 160 and backend software 180. In certain embodiments, the tool 150 may only comprise frontend software 160. The frontend software 160 resides within the Chromium Engine 140 in the IDE 100. The backend software 180 may be physically separate from the computing device that executes the IDE. The frontend software 160 may communicate with the backend software 180 via http, websocket or another mechanism. The backend software may be a standard HTTP/web-based server, responding to browser requests, or a custom back-end separated from the frontend software 160 by a custom protocol, running on the same or a different computer. However, the interface between the frontend software 160 and the backend software 180 is beyond the scope of this disclosure and therefore is not limited by the disclosure.

The Tool-side Renderer API 170 resides within the frontend software 160. Thus, the tool interface code 120 and the frontend software 160 are able to communicate using the Renderer API.

In certain embodiments, the frontend software 160 uses a standard browser interface, which includes a window object, which is a standard object defined by the standards for web technologies. All functions, objects and other information that are part of the Renderer API become part of this window. The Renderer API comprises at least three symbols.

The first symbol is an object and is referred to as the renderer_api_info object. The renderer_api_info object is defined within the tool 150. This object provides information that is needed by the IDE 100 to interact with the tool 150. In certain embodiments, the renderer_api_info object may contain some or all of the parameters shown in FIG. 3. FIG. 3 shows that the object may include a FeatureLevel parameter. The value of this parameter may be used to indicate compatibility between the IDE-side Renderer API 130 located in the IDE 100 and the tool-side Renderer API 170 located in the tool 150. In other embodiments, this may not be utilized.

The renderer_api_info object may also include a parameter that allows the programmer to identify the API using a human readable format. Again, in certain embodiments, this may not be included.

The renderer_api_info object may also include one or more notifications. A notification is an asynchronous communication from the tool 150 to the IDE 100 that provides information or status to the IDE 100. As an example, when the tool 150 modifies a file, the tool 150 may send a notification to the IDE 100, indicating that the file has been modified but not saved. The IDE 100 may display this on the screen, or may use this information in a different way. In FIG. 3, this notification is referred to as "dirtyflag" and is a notification that informs the IDE 100 of the status of the file (i.e., modified but not saved, which is referred to as 'dirty' or 'not dirty'). This notification contains a single argument, called dirtystate, which provides this information to the IDE

100. In certain embodiments, the notification is identified by a notification ID, which may be a number, or a string of characters.

FIG. 3 also shows a second notification. The number of notifications is not limited by this disclosure. Further, each notification may have one or more arguments associated with it.

The renderer_api_info object may also include one or more functions. A function is an asynchronous communication from the IDE 100 to the tool 150 that provides status or a command to the tool. As an example, the user may utilize the user interface of the IDE 100 to request that a file associated with the tool 150 be opened. In response, the IDE 100 issues a function call to the tool 150. In FIG. 3, this function is referred to as "open" and contains two arguments; the name of the file to open and the location of the path. Further, in certain embodiments, the function also includes a description, which ais a human readable description of the function.

A second function may be the save function. This function is referred to as "save" and may contain one argument; the name of the file to save.

FIG. 3 also shows a third function. The number of functions is not limited by this disclosure. Further, each function may have one or more arguments associated with it. Additionally, in certain embodiments, the function is identified by a function ID, which may be a number, or a string of characters.

The second symbol associated with the Renderer API is the execution function. This execution function is used whenever the IDE 100 wishes the tool 150 to perform some operation. The operations that the IDE 100 may perform are provided in the renderer_api_info object, along with the arguments that are associated with each. Note that these are the only functions that the IDE 100 may request the tool 150 to perform. Thus, when the IDE 100 requires that the tool 150 perform some function, it utilizes the protocol defined in the renderer_api_info object. The Renderer API assumes that all functions are asynchronous, indicating that the response to the execution function is received before the actual function is necessarily performed. In certain embodiments, this model may be mimicked by a synchronous request/response cycle, however the Renderer API will convert that in an asynchronous model, which is a functional super-set of the synchronous one and a more general case.

The third symbol associated with the Renderer API is the notification function. This notification function is used whenever the tool 150 wishes to provide some information or status to the IDE 100. The notifications that the tool 150 may provide are defined in the renderer_api_info object, along with the arguments that are associated with each.

In certain embodiments, the notification function may be used by the IDE 100 to define the notification mechanism during initialization. The notification function is called by the tool 150 to notify IDE 100 about information that may be important to the IDE 100. The exact mechanism is specified by the IDE-side renderer API 130, via a mechanism to provide a custom function to the tool-side renderer API 170. This mechanism may be as simple as printing out text in a specified format, or something more complex, depending on the IDE-side driver code.

In certain embodiments, a default notification mechanism may use a custom closure, injected into the frontend software 160 by the IDE 100. In these embodiments, the same mechanisms that are used to execute a Renderer API function, are used to inject a closure that will perform a reverse function. First, the tool 150 triggers this function, which in turn notifies the IDE 100 of a certain change of state. In other embodiments, a simple logging mechanism, such as via the console.log of the Chromium engine 140 or a similar mechanism, could be used. The exact nature depends on the IDE specific code 110 and the IDE-specific communication protocol between tool interface code 120 and the Chromium engine 140.

Figure 4:
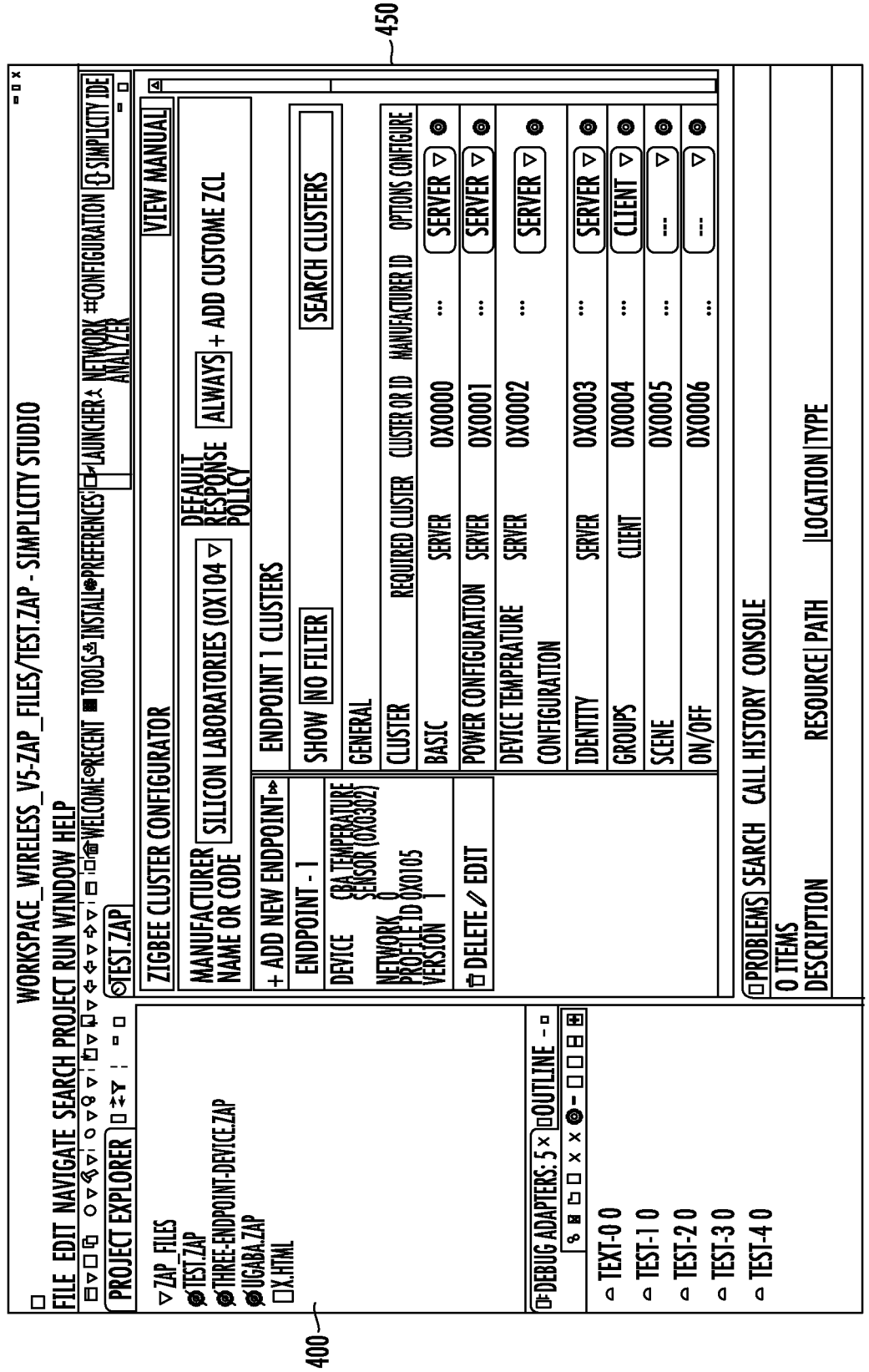
FIG. 4 shows a display where the tool is displayed within the IDE.

FIG. 4 shows an IDE 100 with an integrated tool. The tool window 450 associated with the tool 150 is shown on the right side, while the remaining of the screen 400 is associated with the IDE 100. Thus, when a user modifies information within tool window 450, the IDE 100 is unaware and no interaction is required to affect this change, as these actions are contained completely within the tool frontend software 160. For example, the user may apply a filter in tool window 450 to display only certain clusters. This modification and the subsequent actions occur completely within the tool 150. However, if the user were to attempt to save the changes by using File→Save in the upper left, the IDE 100 would be required to inform the tool 150 of this action, as it is outside of the tool window 450.

Another interaction occurs when the user attempts to exit the IDE 100 or close the tool window 450. Suppose that the user had previously modified the tool window 450, and subsequently, wishes to close the IDE 100 or close the tool window 450 by using File→Exit. If the IDE 100 were to simply close the tool window 450, the changes made by the user to the tool window 450 would be lost. Thus, in certain embodiments, the IDE 100 may wish to know if any changes, which have not yet been saved, have been made to the tool window 450.

These situations are now addressed using the renderer_api_info object and the execution and notification functions that are part of the Renderer API.

Figure 5:
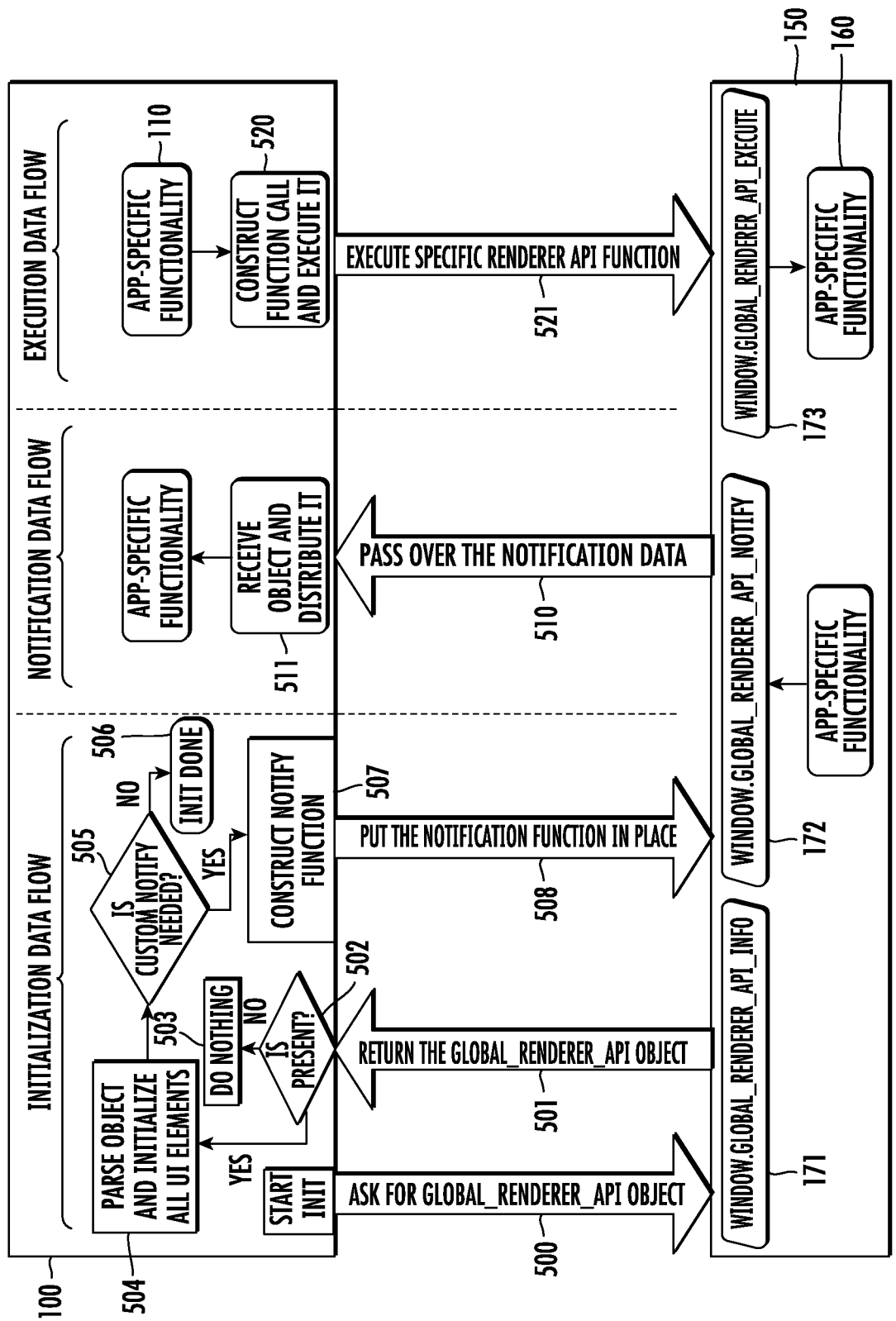
FIG. 5 shows the interaction between the IDE and the tool according to one embodiment.

FIG. 5 shows a representative data flow between the IDE 100 and the tool 150. The three symbols associated with the Renderer API are shown as the renderer_api_info object 171, the notification function 172 and the execution function 173.

The process begins with the IDE-side Renderer API 130 asking for the renderer_api_info object 171 from the tool 150, as shown with arrow 500. If the tool 150 supports this API, it returns the renderer_api_info object 171, as shown with arrow 501.

The IDE 100 checks to see if the renderer_api_info object 171 was returned, as shown in Box 502. If the renderer_api_info object 171 was not returned, the Renderer API is not supported by the tool 150, and no further action is taken, as shown in Box 503.

However, if the renderer_api_info object 171 was returned, the IDE 100 parses the object and initializes all of the user interface elements, as shown in Box 504. For example, if a Renderer API mandates the "save" function, then a standard IDE "File→Save" mechanism will be tied to this Renderer API function. Another example may be a request for a custom menu: the Renderer API may ask for a completely custom function, named "do_something" for example, with a custom label "Do something!". In this case, the IDE software might create a new top-level toolbar action button, with a label "Do something!". The possible scenarios are many, but the Renderer API in all cases serves as a uniform mechanism that ensure that there has to be only one implementation for a given IDE 100 and only one implementation for a given tool 150, providing a separation of mechanism (the actual Renderer API being "the mechanism") and policy (the specific implementation of what IDE does with these tokens being "the policy"). As the point of Renderer API is to be future-looking, the specific policies are not intended to be fixed in time.

The IDE 100 also reviews the notification mechanism used by the tool 150 to ensure that this mechanism is supported, as shown in Box 505. Based on the notifications required by the tool 150, the IDE has, at this point, a choice how to implement these. It is possible that the tool 150 declares notifications that the IDE 100 knows nothing about, in which case the IDE 100 might do nothing, and ignore them completely. It is also possible that the tool 150 might declare notifications, which cause the IDE 100 to perform some specific customizations during initialization time. Alternatively, the IDE 100 might simply support the notifications without any specific prior work. In each case, the point of notification information is for the IDE 100 to prepare necessary mechanisms to handle them.

If the notification mechanism used by the tool 150 is supported by the IDE 100, no further action is needed, as shown in Box 506. However, if the notification mechanism is not supported, the IDE 100 constructs a function to tell the tool 150 the notification mechanism that it requires, as shown in Box 507. In FIG. 5, it is assumed that the notification function is used by the IDE 100 to transmit this information, however a different function may also be used. Once the notification function has been constructed, it is sent to the tool 150, as shown by arrow 508.

Additionally, the IDE 100 may execute its own specific mechanisms to determine how certain functions specified in the renderer_api_info object 171 need to be represented. This is part of the IDE-side Renderer API 130 and is IDE specific. With respect to notifications, similar actions are undertaken. The tool 150 declares standard notifications and it transmits them to the IDE 100. For example, the "dirty" notification is processed by IDE 100 according to its own internal APIs. There is a set of predefined notifications that IDE 100 may understand.

This sequence defines the steps used by the IDE 100 to embed the tool 150 into the IDE 100 such that the IDE 100 is aware of the functionality that the tool 150 supports. Once these steps have been completed, the IDE 100 is ready to call the functions that the tool 150 supports, understands how to transmit information about those functions to the tool 150, and how to interpret the notifications that the tool 150 provides to the IDE 100. Thus, the Renderer API provides the interface between the IDE 100, specifically the IDE specific code 110, and the tool frontend software 160. There is no other communication required between the IDE 100 and the frontend software 160 at this point. It is important to note, that the tool 150 does not learn anything about the capabilities of the IDE 100. The tool 150 performs certain functions and will report notifications to the IDE 100 via its notifications. If the tool 150 expects the IDE 100 to perform a certain action, that expectation is embodied in the implementation of its function/notification interaction, and not via learning about IDE functionality beforehand. As a result, IDE handling of certain notifications can change dynamically, as the tool 150 neither makes assumptions, nor holds any state about the capabilities of the IDE 100 itself. This is also evident in the asynchronous nature of these interactions. In certain embodiments, neither side should ever wait for a response from the other side to ensure fault tolerance.

The right side of FIG. 5 shows the process used when the IDE 100 requests the tool 150 to perform a function. The IDE specific code 110 may note that the user has requested that the file associated with the tool 150 be saved. This command would come from outside the tool window 450, such as by using File→Save. In response, the IDE 100 calls the execution function providing the function ID that is being invoked, as shown in Box 520. The function ID may be included in the renderer_api_info object 171. As shown in FIG. 3, that function may be the save command.

When the user requests that the file be saved, the IDE 100 calls the execution function 173 with the following syntax:
window.renderer_api_execute('save', 'filename')

The execution function 173 is then called within the tool 150 as shown by arrow 521. The execution function ID is one of the functions that was enumerated in the renderer_api_info object 171. As noted above, these functions are asynchronous, such that the response to the function is not provided immediately after transmission of the function.

Rather, the response to the function may be in the form of a notification function. The middle of FIG. 5 shows the process used when the tool 150 wants to report information or status to the IDE 100. As a specific example, assume that the IDE 100 provided an execution command to the tool 150 indicating that a file associated with the tool 150 should be saved. The tool 150 parses this function and performs the requested save function. Once the file has been saved, the tool 150 utilizes a notification function to report to the IDE 100 that the file has been saved.

As shown in FIG. 3, the tool 150 may utilize a dirtyflag notification function to perform this action. After saving the file, the tool 150 may execute the notification function with a notification ID argument 'dirtyflag' that indicates that the file is no longer dirty to the IDE 100. The notification function 172 inside the tool 150 then sends this information to the IDE 100, as shown by arrow 510. Once received, the IDE 100 parses the notification information and performs the necessary action, as shown in Box 511. In one embodiment, the notification function on the tool side may be a console.log with a specific JSON format. The IDE 100 then receives this information via its integration with the Chromium engine 140, and distributes this information to other modules within the IDE 100.

Note that all of the boxes in FIG. 5, with the except of those labelled as app-specific functionality are part of the new and novel API that is described herein.

The present system and method have many advantages. In many current systems, each time that a tool is to integrated into an IDE, two new software programs need to be written. One for the tool, which is specific to the IDE, and the second for the IDE, which is specific to the tool. Therefore, if there are "N" IDEs and "M" tools, to have all tools work with all IDEs, a total of N×M software programs must be written. However, the present disclosure overcomes this issue, by defining a standard API between the IDE and the tool. Thus, in this scenario, if there are "N" IDEs and "M" tools, to have all tools work with all IDEs, a total of N+M software programs must be written. Note that as the number of tools and IDEs increase, this may be a significant reduction in software development.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An integrated software platform, disposed on a non-transitory storage medium, comprising:
   an Integrated Development Environment (IDE), comprising:
   IDE specific code;
   tool interface code;
   a chromium engine; and
   an IDE-side Renderer API;
   two or more tools, each comprising a tool front end that executes within the chromium engine; and
   a tool-side Renderer API;
      wherein each tool-side Renderer API communicates with the IDE-side Renderer API using a standard interface defined by a Renderer_api_info object defined in each respective tool-side Renderer API, wherein the Renderer_api_info object provides information needed by the IDE to interact with the respective tool, wherein the information defines functions and/or notifications that may be exchanged between the IDE and the respective tool;
      wherein the standard interface defined by the Renderer_api_info object defined in one tool-side Renderer API is different from the standard interface defined by the Renderer_api_info object defined in another tool-side Renderer API; and
      wherein each standard interface comprises a notification function, wherein the notification function is used by the IDE to define a notification mechanism that the respective tool is to utilize when providing status or other information to the IDE.

2. The integrated software platform of claim 1, wherein the standard interface comprises an execution function.

3. The integrated software platform of claim 2, wherein the Renderer_api_info object defines one or more functions, wherein a function is a communication from the IDE to the tool to perform an operation.

4. The integrated software platform of claim 3, wherein the IDE constructs the execution function, comprising one of the one or more functions defined in the Renderer_api_info object, to cause the tool to perform the operation.

5. The integrated software platform of claim 1, wherein the Renderer_api_info object defines one or more notifications, wherein a notification is a communication from the tool to the IDE to provide status or other information.

6. The integrated software platform of claim 5, wherein the tool constructs the notification function, comprising one of the one or more notifications defined in the Renderer_api_info object, to inform the IDE of status or other information.

7. An Integrated Development Environment (IDE), disposed on a non-transitory storage medium, comprising:
   IDE specific code;
   tool interface code;
   a chromium engine; and
   an IDE-side Renderer API;
   wherein two or more tools are adapted to execute within the chromium engine;
   wherein each tool and the IDE communicate using a standard interface defined by a Renderer_api_info object defined in each respective tool, wherein the Renderer_api_info object provides information needed by the IDE to interact with the respective tool, wherein the information defines functions and/or notifications that may be exchanged between the IDE and the respective tool;
   wherein the standard interface defined by the Renderer_api_info object defined in one tool-side Renderer API is different from the standard interface defined by the Renderer_api_info object defined in another tool-side Renderer API; and
   wherein each standard interface comprises a notification function, wherein the notification function is used by the IDE to define a notification mechanism that the respective tool is to utilize when providing status or other information to the IDE.

8. The IDE of claim 7, wherein the standard interface comprises an execution function.

9. The IDE of claim 8, wherein the Renderer_api_info object defines one or more functions, wherein a function is a communication from the IDE to the tool to perform an operation and wherein the IDE constructs the execution function, comprising one of the one or more functions defined in the Renderer_api_info object, to cause the tool to perform the operation.

10. A method of integrating two or more tools with an Integrated Development Environment (IDE), wherein the IDE comprises a chromium engine and each tool comprises frontend software that executes within the chromium engine, the method comprising:
    including an IDE-side Renderer API in the IDE;
    including a tool-side Renderer API in each tool; and
    wherein each tool-side Renderer API communicates with the IDE-side Renderer API using a standard interface defined by a Renderer_api_info object defined in the respective tool-side Renderer API, wherein the Renderer_api_info object provides information needed by the IDE to interact with the respective tool, wherein the information defines functions and/or notifications that may be exchanged between the IDE and the respective tool; wherein the standard interface defined by the Renderer_api_info object defined in one tool-side Renderer API is different from the standard interface defined by the Renderer_api_info object defined in another tool-side Renderer API; and
    wherein each standard interface comprises a notification function, wherein the notification function is used by the IDE to define a notification mechanism that the respective tool is to utilize when providing status or other information to the IDE.

11. The method of claim 10, wherein the standard interface comprises an execution function.

12. The method of claim 11, wherein the Renderer_api_info object defines one or more functions, wherein a function is a communication from the IDE to the tool to perform an operation.

13. The method of claim 12, wherein the IDE constructs the execution function, comprising one of the one or more functions defined in the Renderer_api_info object, to cause the tool to perform the operation.

14. The method of claim 10, wherein the Renderer_api_info object defines one or more notifications, wherein a notification is a communication from the tool to the IDE to provide status or other information.

15. The method of claim 14, wherein the tool constructs the notification function, comprising one of the one or more notifications defined in the Renderer_api_info object, to inform the IDE of status or other information.

* * * * *